(12) United States Patent
Subramanya

(10) Patent No.: US 9,633,103 B2
(45) Date of Patent: Apr. 25, 2017

(54) IDENTIFYING PRODUCT GROUPS IN ECOMMERCE

(71) Applicant: Wal-Mart Stores, Inc., Bentonville, AR (US)

(72) Inventor: Shankara B. Subramanya, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 758 days.

(21) Appl. No.: 14/042,285

(22) Filed: Sep. 30, 2013

(65) Prior Publication Data

US 2015/0095291 A1 Apr. 2, 2015

(51) Int. Cl.
*G06F 17/00* (2006.01)
*G06F 17/30* (2006.01)
*G06Q 30/00* (2012.01)

(52) U.S. Cl.
CPC .... *G06F 17/30598* (2013.01); *G06F 17/3053* (2013.01); *G06Q 30/00* (2013.01)

(58) Field of Classification Search
CPC .................................................. G06F 17/30
See application file for complete search history.

(56) References Cited

U.S. PATENT DOCUMENTS

| | | | | |
|---|---|---|---|---|
| 2003/0037050 | A1* | 2/2003 | Monteverde | G06F 17/30864 |
| 2003/0172349 | A1* | 9/2003 | Katayama | G06F 17/3061 |
| | | | | 715/229 |
| 2005/0222987 | A1* | 10/2005 | Vadon | G06F 17/30997 |
| 2005/0289140 | A1* | 12/2005 | Ford | G06F 17/30705 |
| 2013/0073335 | A1* | 3/2013 | Tang | G06Q 30/02 |
| | | | | 705/7.29 |

* cited by examiner

*Primary Examiner* — Apu Mofiz
*Assistant Examiner* — Farhad Agharahimi
(74) *Attorney, Agent, or Firm* — Bryan Cave LLP

(57) ABSTRACT

Systems and methods are disclosed herein for supplementing product records with product groups that are relevant to the product records. Queries form users may be analyzed to extract keywords. Search results for keywords are evaluated to determine category consistency among product records, including such values as entropy and taxonomy depth. Those keywords with search results having adequate category consistency are selected as product groups and the search results associated with the product groups. Product groups are associated with product records according to a random walk of a graph having as nodes products and product groups and links representing belonging of a product to a product group. Product groups may be selected based on a transition probability based on a random walk and a quality score based on usage of a product group page for the product group.

14 Claims, 6 Drawing Sheets

IDENTIFYING PRODUCT GROUPS IN ECOMMERCE

RELATED U.S. APPLICATION

This application is related to U.S. application Ser. No. 14/042,340, filed Sep. 30, 2013. The application is incorporated herein by reference for all purposes.

TECHNICAL FIELD

This invention relates to systems and methods for supplementing product information on an ecommerce site.

BACKGROUND

It is the goal of many online retailers to provide consumers with products they are seeking. It is further a goal of many online retailers to supplement a description of a desired product with other products that may be of interest to a consumer. It is a common experience to see a "related products" section or a section indicating "people who bought this product also bought . . . ." Although products may be "related" due to co-purchasing, such data may not be available for some products and co-purchasing events may not be characteristic of broad consumer interests.

The systems and methods disclosed herein provide an improved approach to identifying groups of products that are relevant to a given product.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
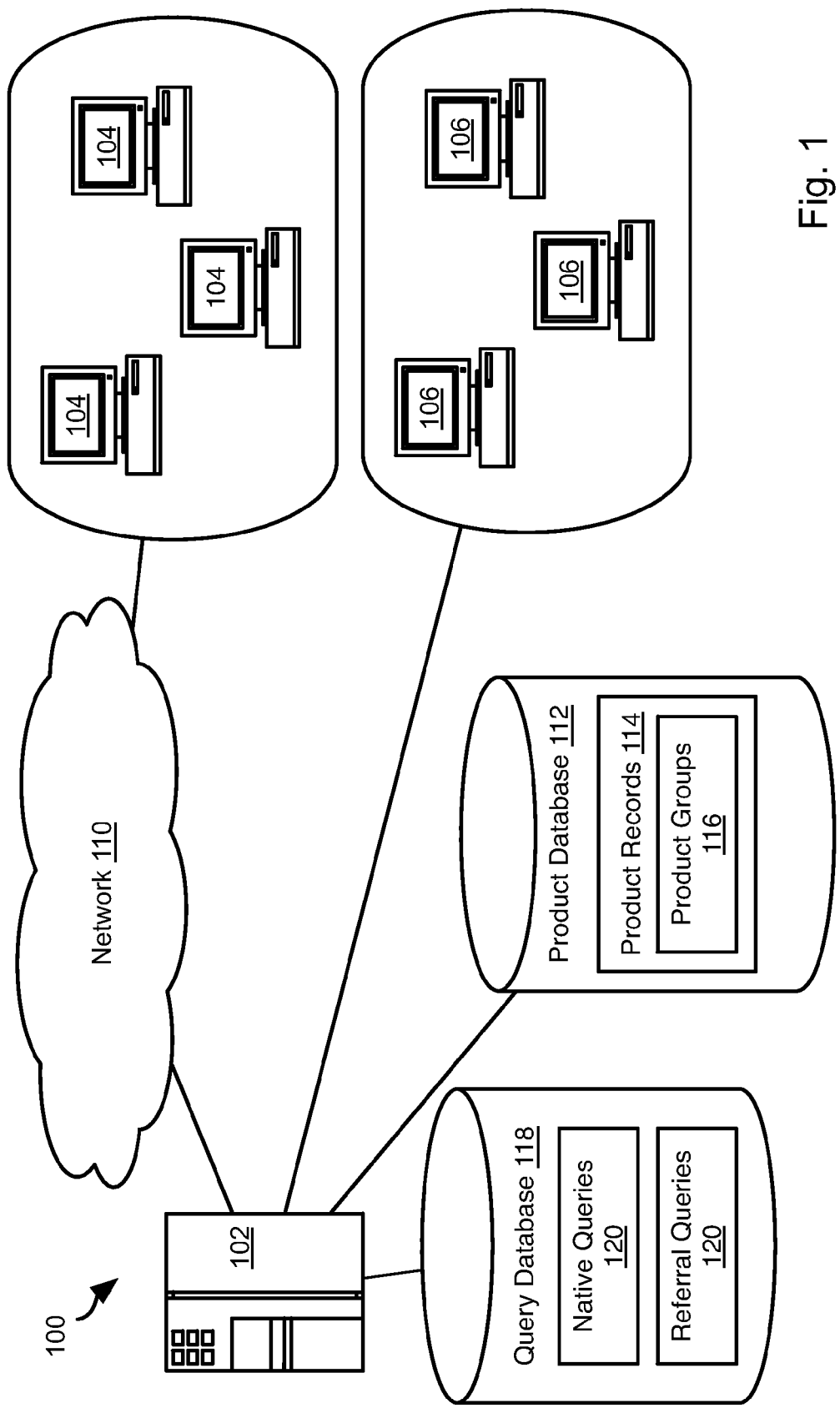
FIG. 1 is a schematic block diagram of a system for performing methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more merchant workstations 104 and one or more customer workstations 106. In the methods disclosed herein, the merchant workstations 104 and customer workstations 106 may be embodied as mobile devices such as desktop computers or other computing device such as a mobile phone or tablet computer.

In some embodiments, some or all of the methods disclosed herein may be performed using a desktop computer or any other computing device as the merchant workstations 104 and customer workstations 106. For purposes of this disclosure, discussion of communication with a user or entity or activity performed by the user or entity (e.g. analyst, customer, merchant) may be interpreted as communication with a computer 104, 106 associated with the user or entity or activity taking place on a computer associated with the user or entity. The merchant workstations 104 may be viewed as a merchant computer network 104 whereby tasks to be performed by a merchant representative may be performed by any member of the population by means of logic implemented by the computer network, the server system 102, or some other entity.

Some or all of the server 102, merchant computers 104, and customer workstations may communicate with one another by means of a network 110. The network 110 may be embodied as a peer-to-peer connection between devices, a connection through a local area network (LAN), WiFi network, the Internet, or any other communication medium or system. Each of the populations 104, 106 of workstations may be coupled to one another by separate networks some or all of the three populations 104, 106 of workstations may share a common network. For example, in the illustrated embodiments, the merchant workstations and server system 102 may communicate over a separate private network, rather than over the network 110.

The server system 102 may be associated with a merchant, or other entity, providing search services. For example, the server system 102 may host a search engine or a site hosted by a merchant to provide access to information about products and user opinions about products. For example, the server system may host or access a product database 112 storing a plurality of product records 114. The product records 114 may have one or more product groups 116 associated therewith using the methods disclosed herein. A product group 116 may be associated with the product record 114 by means of a link embedded in the product record 114 that references a product group page for the product group 116.

The method described herein may make use of data known about queries and user responses to queries. Accordingly, the server system 102 may host or access a query database 118 of queries 120. A record for a query may include native queries 120 that are submitted to the server 102 by means of a search interface provided by the server 102 or providing an interface to the server 102 and displayed on a user workstation 106. The query database 118 may further store referral queries 120. For example, a search engine such as GOOGLE, YAHOO, or BING may direct users to a merchant's website. The referral request for a webpage of the merchant may be accompanied by a query that prompted the search engine to present a link to the web page. Such queries may therefore be stored as referral queries 120.

Figure 2:
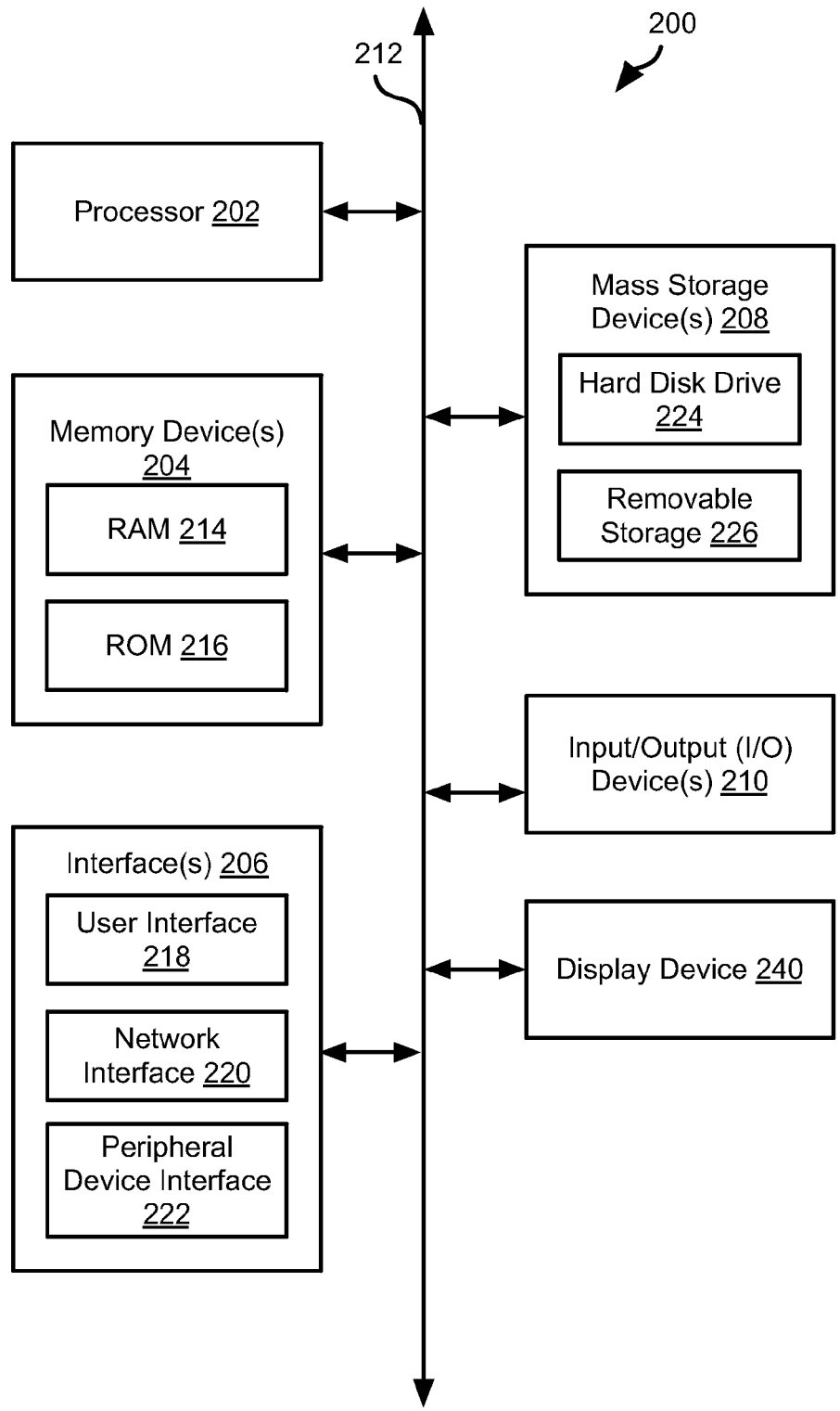
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, merchant workstation 104, and customer workstation 106, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more non-transitory mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
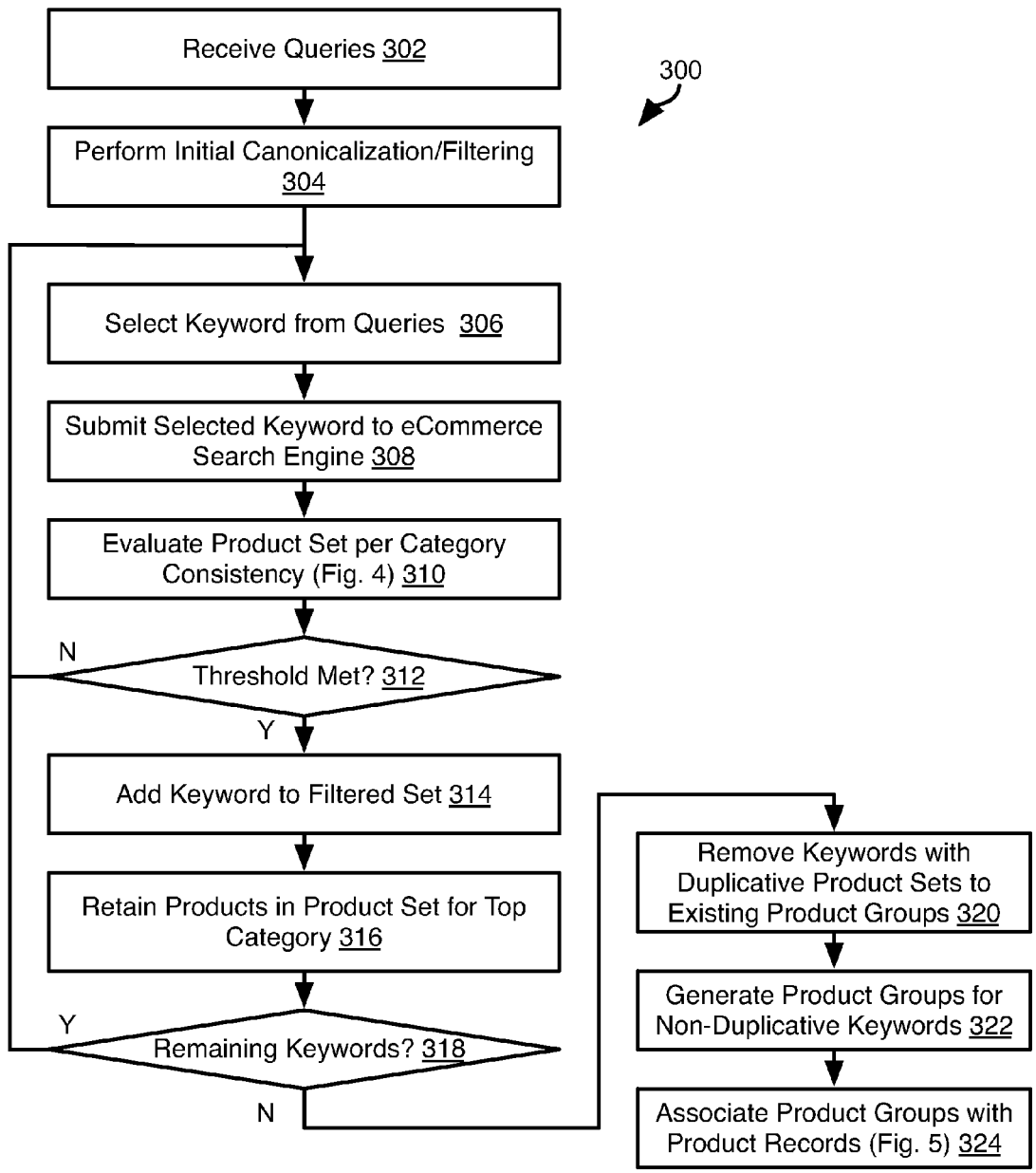
FIG. 3 is a schematic block diagram of a method for defining a product group in accordance with an embodiment of the present invention.

FIG. 3 illustrates a method 300 for defining product groups. The method 300 may include receiving 302 queries. As noted above, queries may be native queries submitted by users directly to a website of a merchant or referral queries from a search engine or other entity. The constituent terms of the queries may then be parsed from the queries and the constituent terms of the queries may be subjected to a canonicalization and filtering at step 304. In particular, step 304 may remove duplicate terms (dedupe) the constituent terms and transform the constituent terms into a canonical form. Transforming into a canonical form may include de-pluralizing terms, replacing terms with a canonical version based on an index of synonyms and otherwise ensuring that constituent terms representing the same concept are represented by a single term in a filtered set of terms remaining after step 304. Where multiple terms representing the same concept occur, the more popular representation of the concept may be used to represent the concept. Step 304 may further include removing "stop" words that are not relevant such as "a," "an," "and," "or," and the like. In determining whether a phrase or term is equivalent to another word order and/or white space may be ignored.

After the filtering step 304, each term in the set of constituent terms may be represented by an entry that includes a canonical term as well as one or more constituent terms that were identified as duplicates of the canonical term during step 304.

Using the filtered set of constituent terms, hereinafter "keywords," from the queries, the keywords may be processed individually according to some or all of steps 306-318. For example, a keyword may be selected 306 and submitted 308 to a search engine, such as a search engine operable to search a product taxonomy and/or other product records to find product records that are relevant to a given query. The search engine may be a search engine used to process queries received on an ecommerce website. The search engine may use any algorithm known in the art to determine relevance of a keyword to a product record in the taxonomy and may evaluate some or all of the text of a product record, a location of the product record in the taxonomy, an external taxonomy of concepts, a dictionary or other reference work, and the like.

A set of product records ("product set") may be received from the search engine as a result of step 308. The product set may then be evaluated 310 to determine a degree of category consistency of the product set. An example method by which the category consistency of a product set may be determined is described below with respect to FIG. 4. An output of step 310 may include a score indicating a degree of category consistency of the product set as described below with respect to FIG. 4. In general, the category consistency of the product set indicates how similar the products of the product set are to one another. An output of step 310 may further include one or more categories representing the most common category represented by the product set.

The method 300 may further include evaluating whether the score from step 310 meets a threshold condition. In embodiments where a higher score indicates greater category consistency, the threshold condition may be exceeding a minimum threshold. In embodiments where a lower score indicates greater category consistency, the threshold condition may include being below a maximum threshold.

If the score for the product set for the keyword is found 314 to meet the threshold condition, then the keyword and its product set are added 314 to a filtered set. As noted above, a result of the evaluation 310 may be one or more main categories for the product set. The method 300 may further include retaining only those products records in the product set that belong to these one or more main categories and removing any other product records from the product set. As noted above, product records may be part of a product taxonomy, e.g. leaf nodes of a product taxonomy, that has as nodes categories having child nodes that are sub categories of the category or leaf nodes belonging to the category. Accordingly, those product records in the result set that are not a descendants of the one or more main categories in the product taxonomy may be removed at step 316.

If there are found 318 to be other keywords to be processed, then the method 300 may continue at step 306 with the selection of another keyword for processing according to steps 308-316.

For the filtered set of keywords and their corresponding product sets, the method 300 may include removing 320 those keywords whose product sets indicate duplication of already defined product groups. The keywords and their corresponding product sets may be used as product groups. Accordingly, where the product set of a keyword has a high degree of overlap with another product group, the keyword may be removed such that a duplicative product group is not generated. Duplicity may be determined using a Jaccard similarity score: $J(PG_1, PG_2)=(PG_1 \cap PG_2)/(PG_1 \cup PG_2)$, where $PG_1$ is the product set for a keyword and $PG_2$ is a product set for an existing product group. As known in the art, where there is a high degree in overlap in two sets, the Jaccard score will be higher. Keywords having a Jaccard score with respect to an existing product group that is higher than a threshold value may therefore be removed as being duplicative. The Jaccard score can be any value from 0 to 1, with 1 indicating identical sets. Accordingly, the threshold Jaccard score may be between 0.8 and 0.9 in some embodiments, between 0.9 and 0.95 in still other embodiments, and between 0.05 and 0.99 in yet another embodiment. In some embodiments, the Jaccard similarity score may be approximated using the MinHash algorithm, which allows for scaling and fast deduplication Those keywords and corresponding product sets remaining after step 320 may be used to generate 322 product groups. Generating product groups may include adding the keywords and corresponding product sets to a database of product groups or otherwise storing the keywords and corresponding product sets for use according to other methods disclosed herein or some other use.

For example, the method 300 may further include associating 324 product groups with product records. An example method for associating product groups with product records is described below with respect to FIG. 5. In particular, the product groups associated with a product record may include product groups other than those for which the product record belongs to a product set thereof, as is described in greater detail with respect to FIG. 5.

Figure 4:
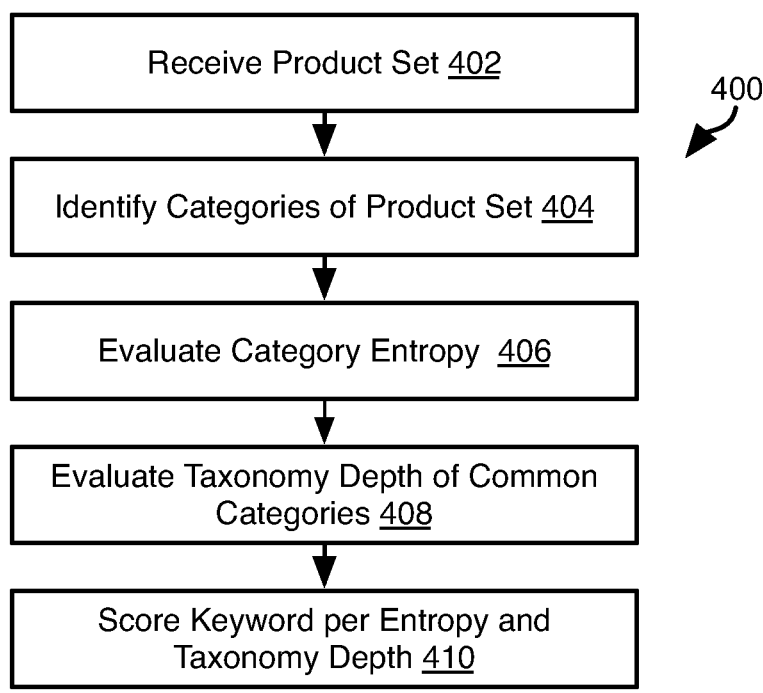
FIG. 4 is a process flow diagram of a method for scoring a candidate keyword for use in defining a product group in accordance with an embodiment of the present invention.

FIG. 4 illustrates a method 400 for evaluating category consistency of a product set for a keyword. The method 400 may include receiving 402 the product set for a keyword and identifying 404 categories represented by the product set. Where the product records of the product set are nodes in a taxonomy, the categories for a product may be the ancestor nodes of the product record in the taxonomy. The categories for a product record may include some or all of the ancestor nodes of the product record in the taxonomy.

The method 400 may further include evaluating a category entropy 406 for the product set. Any metric for characterizing the entropy or consistency of a set of values may be used. As known in the art, one metric for computing entropy is $H=-\Sigma p_i \log_2 p_i$, where i is a category with at least one product record corresponding thereto in the product set and $p_i=n_i/N$, where $n_i$ is the number of product records in the product set in category i and N is the total number of product records in the product set.

In some embodiments, entropy may be approximated by a consistency score $CS=n/(N-n)$, where n is the number of product records belonging to a most common category (the category having the largest number of product records in the product set belonging thereto) and N is the total number of product records in the product set. The most common category may be a category that is greater than a threshold distance from a root of the taxonomy or top-level categories of the taxonomy and has the greatest number of product records in the product set that belong to that category. As noted above, a result of the evaluation 310 of the method 300 includes a category. This category may be the most common category that is greater than the threshold distance from the root of the taxonomy or top-level categories of the taxonomy.

The method 400 may further include evaluating 408 a taxonomy depth of common categories represented by the product set. For example, for the categories represented by the product set, the furthest category from the root or top level nodes of the taxonomy to which at least X percent of the product records in the product set belong may be identified. The value of X may be from 80 to 90 percent in some embodiments, from 90 to 95 percent in other embodiments, and from 95 to 99 percent in still other embodiments. The distance from the root or top-level nodes of the taxonomy of this identified category may be used as the taxonomy depth of the product set. In some embodiments, the taxonomy depth is the lowest category in the taxonomy to which all of the product records in the product set belong. In some embodiments, the category identified as defined in this paragraph for determining taxonomy depth may be used as the category returned as a result of execution of step 310 of the method 300.

The entropy, which may be approximated by the consistency score, may be combined with the taxonomy depth to score 410 the keyword and corresponding product set. The scores may be summed, weighted and summed, or otherwise combined to obtain a score for the keyword and its product group. This score may then compared to a threshold at step 312 of the method 300. Alternatively, scores may be separately compared to separate thresholds. The threshold condition may be met if all thresholds are exceeded (for minimum thresholds) or not exceeded (for maximum thresholds). Alternatively, a threshold condition may be met if less than all of the individual thresholds for the individual scores are met. In some embodiments, the score for a keyword may additionally be determined based on a comparison of a number of product records in a most common category as determined above to a threshold. For example, if the number of product records belonging to the most common category is less than N (e.g. 5, 6, or some other predetermined value), the threshold condition may be determined at step 312 not to have been met regardless of the consistency score and taxonomy depth score.

Figure 5:
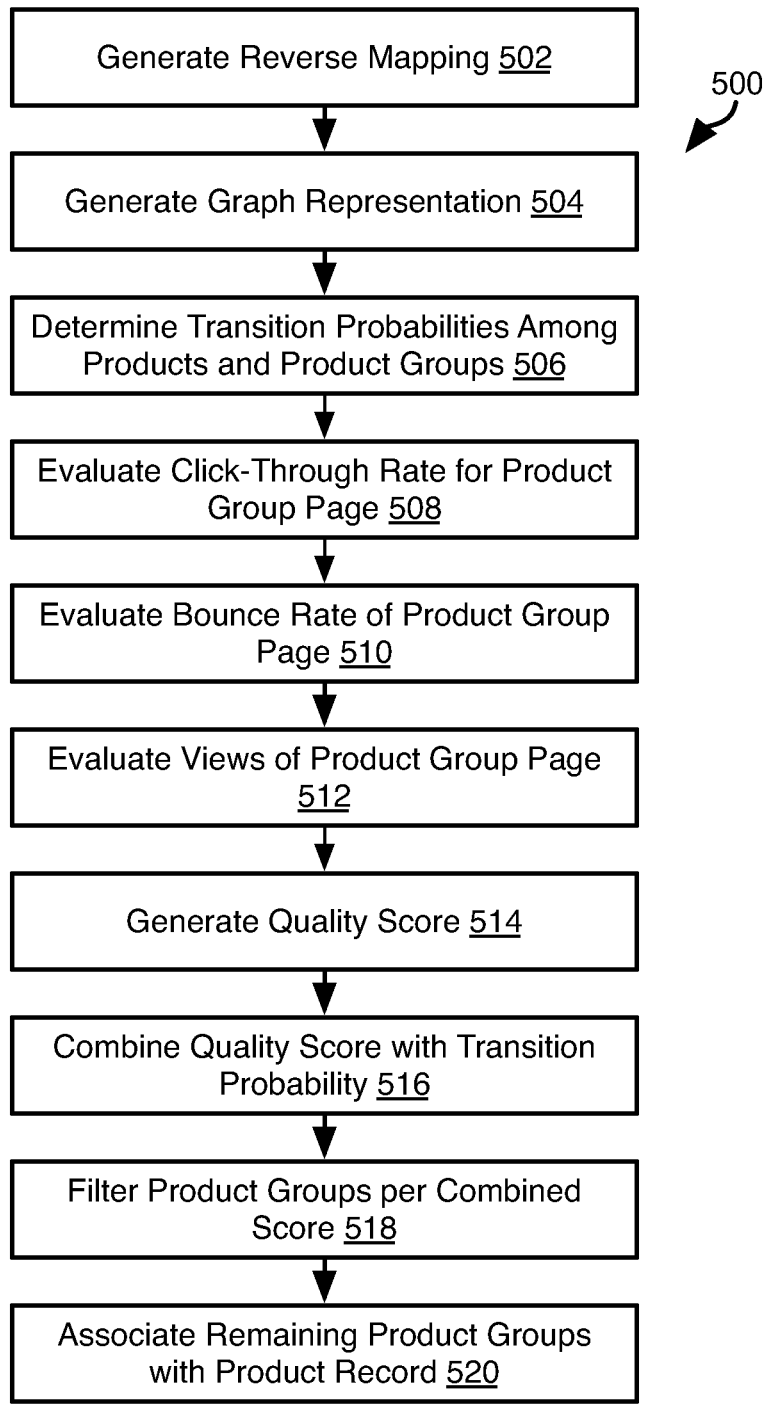
FIG. 5 is a process flow diagram of a method for associating product groups with a product in accordance with an embodiment of the present invention.

FIG. 5 illustrates a method 500 that may be used to associate product groups with products, such as product groups defined according to the method 300 of FIG. 3. The method 500 may take as input a set of product groups, each having a product group identifier, e.g. a keyword, and a set of products belonging to that group. The method 500 may include generating 502 a reverse mapping based on the product groups. For example, rather than having a set of product groups with a set of product records associated therewith, the reverse mapping may include product records, each product record having a set of one or more product groups to which the each product record belongs.

Figure 6:
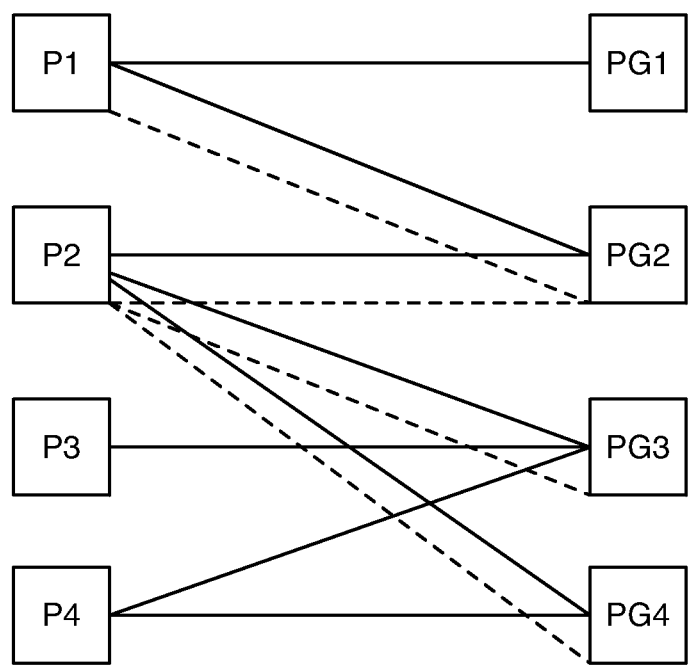
FIG. 6 is a diagram of a graph for determining relationships among products and product groups in accordance with an embodiment of the present invention.

The method 500 may further include generating 504 a graph representation of the product groups. The graph representation may be as shown in FIG. 6. In particular, the graph may have as nodes, product groups and product records. A connection between a product group and a product record may indicate that the product record belongs to that product group. The reverse mapping may be used to generate the graph by enabling the identification of product groups to which a product record may be connected. In some embodiment, the product groups and corresponding product sets may be used in combination with the reverse mapping to traverse the graph if it were to be generated but no actual graph is generated or otherwise represented within a computer system as such.

The method 500 may include determining 506 transition probabilities among products and product groups using the graph, or data sufficient to define the graph. The transition probabilities may be based on, or simulate, a random walk across the graph. For example, as shown by the dotted line in FIG. 6, random walk commencing at product P1 may proceed to product group PG2 due to P1 belonging to the product set of PG2. The random walk may proceed from PG2 to product P2 due to P2 belonging to the product set of PG2. The random walk may proceed from P2 to either of product groups PG3 and PG4 due to P2 belonging to the product sets of both of these product groups. Accordingly, P1 has a non-zero transition probability with respect to PG1 and PG2 due to P1 belonging to the product sets for these product groups. P1 also has a non-zero transition probability with respect to PG3 and PG4 based on the random walk.

As known in the art, transition probabilities for a random walk do not require actual traversal of possible paths across the graph but may be determined from a matrix representation of the graph. For example, a matrix A may have rows i representing each node of the graph and columns j representing each node of the graph. A value of 1 at matrix element $a_{ij}$ indicates that node i is connected to node j in the graph, whereas a value of 0 indicates no connection. By multiplying the matrix A by itself, the transition probabilities between nodes for a random walk of one hop can be determined. For a given initial matrix A(i,j), the transition probabilities after t hops ($A^t(i,j)$) may be given by (1). However, any other method known in the art for determining or approximating transition probabilities for a given graph may also be used.

$$A^t(i, j)) = \begin{cases} A(i, j) & t = 1 \\ \sum_k A(i, k)A^{t-1}(k, y) & t > 1 \end{cases}$$

In some embodiments of the invention, the number of hops is limited to three, or some other finite value. As discussed below, the transition probabilities for product groups may be used to characterize the relevance or usefulness of a product group.

In some embodiments, as noted below, the product groups to which a product record belongs may be associated with a product page associated with the product record. For example, links to product group pages may be included in the product page. In some embodiments, the value of the matrix A may be initially set to the click through rate for the links to the product group page. For example, for product i having links to product group j, the value $a_{ij}$ in A may be initially set to the click-through rate for product group j. The click-through rate may be based exclusively on user response to the link from i to j or may be based on user response to all links to product page j.

In some embodiments, the relevance of a product group may be further characterized by one or more "quality" metrics. For example, the method 500 may include evaluating 508 a click-through rate for a product group page, evaluating 510 a bounce rate of the product group page, and evaluating 512 a number of views of the product group page. The product group page may be a page that presents some or all of an identifier or label of a product group, some or all of the products belonging to that product group, and other content that may be human generated to describe or promote a product group. Links to the product group page may be presented as search results in response to searches on an ecommerce web site or displayed adjacent to or within web pages for products belonging to the product group. Accordingly, as known in the art, the click-through rate for a product group page is the number of times such links are clicked or otherwise selected by users to request the product group page divided by the number of times such links are presented to users. The bounce rate may be defined as the number of times a user views the product page without interacting with a link or other element on the page divided by the number of views of the product page.

A quality score may be generated for the product group page according to the evaluations 508-512. In particular, the values determined at steps 508-512 may be combined to generate a quality score. The bounce rate may be inversely proportional to quality and may therefore be inverted prior to combination. The values may be combined by summing, weighting and summing, multiplication, or some other means.

The quality score for a product group page may be combined with the transition probability for the product group corresponding to the product group page. Again, combination may be by means of summing, weighting and summing, multiplication, or some other means. In some embodiments, a product page will not have sufficient date to compute a quality score, e.g. it has not been available to users long enough. In such embodiments, the transition score alone may be used to associated product groups with product records until such usage data becomes available.

For a given product record, the combined scores of product groups indicated in the reverse mapping as corresponding to the given product record may be evaluated. The product groups for the given product record may be filtered 518 according to the combined scores thereof. For example, the top N, e.g. three or four, product groups with the highest scores may be selected and other product groups removed from consideration for the given product record. The product groups remaining after filtering may be associated with the given product record. In particular, the product groups may be displayed on a web page or other document presenting a product record to a user. For example, links to product group pages may be included in a web page containing information from the product record. The links may be presented in the web page as the keywords associated with the product group according to the methods of FIGS. 3 and 4. The web page for the product record with the product group links may then be presented in response to user queries or returned to a user browser when requested by a user through a browser.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for supplementing product information, the method comprising, by a computer system:
  receiving a plurality of keywords;
  for each keyword of at least a portion of the plurality of keywords, obtaining a result set for the each keyword by searching a product taxonomy;
  obtaining a filtered set of keywords from the at least the portion of the plurality of keywords by filtering a set of keywords according to categories of result sets for the set of keywords, wherein the obtaining comprises, for the each keyword of the at least the portion of the plurality of keywords and the result set for the each keyword:

evaluating a categorical similarity among products of the result set for the each keyword, wherein the evaluating comprises calculating a category consistency of the result set for the each keyword, and wherein the calculating comprises calculating the category consistency as $n/(N-n)$, where n is a number of products in the result set for the each keyword and belonging to a most common category in categories represented in the result set for the each keyword and where N is a total number of products in the result set for the each keyword;

assigning a score to the each keyword according to the categorical similarity; and filtering the at least the portion of the plurality of keywords according to scores assigned thereto to obtain the filtered set of keywords; and defining product groups for at least a portion of the filtered set of keywords, each product group having associated therewith a keyword from the filtered set of keywords and one or more products from the result set for the keyword from the filtered set of keywords.

2. The method of claim 1, wherein the plurality of keywords are extracted from user queries.

3. The method of claim 1, wherein receiving the plurality of keywords comprises:

receiving a plurality of queries;

de-duplicating constituent terms of the plurality of queries and transforming the constituent terms into canonical forms to obtain a processed set of terms; and using the processed set of terms as the plurality of keywords.

4. The method of claim 1, wherein evaluating categorical similarity among products of the result set for the each keyword further comprises determining a distance in the product taxonomy from a root node in the product taxonomy of a most common category of the product taxonomy represented in the result set for the each keyword.

5. The method of claim 4, wherein evaluating categorical similarity among products of the result set for the each keyword further comprises:

determining a category consistency of the result set for the each keyword; and wherein assigning a score to the each keyword comprises assigning a score corresponding to a combination of the distance and the category consistency.

6. The method of claim 1, further comprising for each keyword of the filtered set of keywords and each result set for the keyword of the result sets corresponding to the each keyword, removing from the result sets products that do not belong to a most common category represented in the result set for the keyword.

7. The method of claim 1, further comprising associating one or more product groups of the defined product groups with products of the product taxonomy.

8. A system for supplementing product information, the system comprising one or more processors and one or more memory devices operably coupled to the one or more processors, the one or more memory devices storing executable and operational data effective to cause the one or more processors to:

receive a plurality of keywords;

for each keyword of at least a portion of the plurality of keywords, obtain a result set for the each keyword by searching a product taxonomy;

obtain a filtered set of keywords from the at least the portion of the plurality of keywords by filtering a set of keywords according to categories of result sets for the set of keywords, wherein the executable and operational data are further effective to cause the one or more processors to obtain the filtered set of keywords from the at least the portion of the plurality of keywords by filtering the set of keywords according to categories of the result sets for the set of keywords by, for each keyword of the at least the portion of the plurality of keywords and the result set for the each keyword performing:

evaluating categorical similarity among products of the result set for the each keyword, wherein the executable and operational data are further effective to cause the one or more processors to evaluate the categorical similarity among products of the result set for the each keyword by calculating category consistency of the result set for the each keyword and wherein the executable and operational data are further effective to cause the one or more processors to calculate the category consistency of the result set for the each keyword by calculating the category consistency as $n/(N-n)$, where n is a number of products in the result set for the each keyword and belonging to a most common category in categories represented in the result set for the each keyword and where N is a total number of products in the result set for the each keyword;

assigning a score to the each keyword according to the categorical similarity; and filtering the at least the portion of the plurality of keywords according to the scores assigned thereto to obtain the filtered set of keywords; and define product groups for at least a portion of the filtered set of keywords, each product group having associated therewith a keyword from the filtered set of keywords and one or more products from the result set for the each keyword from the filtered set of keywords.

9. The system of claim 8, wherein the plurality of keywords are extracted from user queries.

10. The system of claim 8, wherein the executable and operational data are further effective to cause the one or more processors to receive the plurality of keywords by:

receiving a plurality of queries;

de-duplicating constituent terms of the plurality of queries and transforming the constituent terms into canonical forms to obtain a processed set of terms; and using the processed set of terms as the plurality of keywords.

11. The system of claim 8, wherein the executable and operational data are further effective to cause the one or more processors to evaluate categorical similarity among products of the result set for the each keyword by determining a distance in the product taxonomy from a root node in the product taxonomy of a most common category of the product taxonomy represented in the result set for the each keyword.

12. The system of claim 11, wherein the executable and operational data are further effective to cause the one or more processors to evaluate categorical similarity among products of the result set for the each keyword by:

determining a category consistency of the result set for the each keyword; and wherein assigning a score to the each keyword comprises assigning a score corresponding to a combination of the distance and the category consistency.

13. The system of claim 8, wherein the executable and operational data are further effective to cause the one or more processors to, for each keyword of the filtered set of keywords and each result set of the each keyword of the result sets corresponding to the each keyword, remove from the result sets products that do not belong to a most common category represented in the result set of the each keyword.

14. The system of claim 8, wherein the executable and operational data are further effective to cause the one or more processors to associate one or more product groups of the defined product groups with products of the product taxonomy.

* * * * *